(12) United States Patent  
Singh et al.

(10) Patent No.: US 8,786,590 B2  
(45) Date of Patent: *Jul. 22, 2014

(54) IMAGE PROCESSING ARRANGEMENT ILLUMINATING REGIONS OF AN IMAGE BASED ON MOTION

(71) Applicant: STMicroelectronics International N.V., Amsterdam (NL)

(72) Inventors: Surinder Pal Singh, Noida (IN); Kaushik Saha, Delhi (IN); Sumit Johar, New Delhi (IN)

(73) Assignee: STMicroelectronics International N.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/069,026

(22) Filed: Oct. 31, 2013

(65) Prior Publication Data

US 2014/0055438 A1 Feb. 27, 2014

Related U.S. Application Data

(63) Continuation of application No. 12/895,629, filed on Sep. 30, 2010, now Pat. No. 8,577,179.

(30) Foreign Application Priority Data

Aug. 19, 2010 (IN) .......................... 1969/DEL/2010

(51) Int. Cl.  
*G09G 5/00* (2006.01)  
*G06T 1/00* (2006.01)

(52) U.S. Cl.  
CPC ... *G09G 5/00* (2013.01); *G06T 1/00* (2013.01)  
USPC ........................................................ 345/211

(58) Field of Classification Search  
None  
See application file for complete search history.

(56) References Cited

U.S. PATENT DOCUMENTS

2008/0307243 A1 12/2008 Lee  
2011/0032430 A1 2/2011 Prieto et al.

OTHER PUBLICATIONS

Hulze, Hendriek Groot and de Greef, Pierre. "50.2: Power Savings by Local Dimming on a LCD Panel with Side Lit Backlight." SID Symposium Digest of Technical Papers. vol. 40. No. 1. Blackwell Publishing Ltd., 2009.

*Primary Examiner* — Stephen R Koziol  
*Assistant Examiner* — Raphael Schwartz  
(74) *Attorney, Agent, or Firm* — Hogan Lovells US LLP (57) ABSTRACT

An image processing arrangement includes an input to receive an indicator of a power characteristic related to an image processing arrangement and an image processor to process an image based on the indicator of the power characteristic.

27 Claims, 9 Drawing Sheets

IMAGE PROCESSING ARRANGEMENT ILLUMINATING REGIONS OF AN IMAGE BASED ON MOTION

RELATED APPLICATION

The present invention is a continuation of U.S. patent application Ser. No. 12/895,629 filed Sep. 30, 2010, which claims the benefit of priority of Indian Patent Application 1969/DEL/2010 filed Aug. 19, 2010, both of which are incorporated herein in their entirety by this reference.

BACKGROUND OF THE INVENTION

The present invention relates to power management for a display. The invention further relates to but is not limited to power management for a display in a battery powered electronic device.

Conventionally, portable electronic devices such as cellular phones, portable digital assistants (PDA) or portable media players are equipped with battery or electrical power storage means for storing electrical charge to power to the electronic device when not connected to an alternating current (AC) or "mains" power source. Development of such portable devices has led to improvements in power management and efficiencies relating to transceiver processors, battery storage and displays. However a further design movement is to include larger display modules to enable a richer user experience. These larger displays generally consume or require more electrical power to operate than a smaller similar technology display module.

Furthermore the display module can be one of the largest power consuming components in any system. For example typical power consumption figures for a CMEL P0430WQLx-T 4.3" 480×272 pixel display is in the order of 800 mW and a Densitron P0430WQLB 4.3" 480×272 pixel display unit has a typical power consumption of 700 mW and a maximum power consumption of 950 mW. Power consumed in a display is typically directly proportional to the sum of the squares of the illumination of individual pixels. This is especially true for cathode ray tube (CRT), light emitting diodes (LED), organic light emitting diodes (OLED) and related display technologies. Conventionally to decrease the power requirement of a display module the brightness level of the entire display module is controlled. This can be seen, for example, in many portable computers which are configured to operate with a higher intensity back lighting or illumination when the device is connected to the mains power supply and a lower intensity when operating on battery or similar portable power supply. However this has the disadvantage that the visibility of the display module is adversely impacted at very low power levels, for example when displaying images with very low lit scenery or in bright sunlight where the image contrast is overwhelmed by the background light.

SUMMARY OF THE INVENTION

What is desired are embodiments, according to the present application, that are provided to address the above problem.

There is provided according to the disclosure of the present invention an image processing arrangement comprising: an input configured to receive at least one indicator of a power characteristic related to the image processing arrangement; and an image processor configured to process an image based on the at least one indicator of the power characteristic.

The image processor may comprise a geometric modulator configured to geometrically modulate the image based on the at least one indicator of the power characteristic.

The geometric modulator may further comprise a geometric scale factor determiner configured to determine a geometric scale factor based on the at least one indicator of the power characteristic, wherein the geometric modulator is configured to geometrically modulate the image based on the geometric scale factor.

The geometric scale factor determiner may be configured to determine a geometric scale factor further based on at least one of: a minimum image size; a maximum rate of change of image size; and an original image size.

The image processor may comprise an illumination modulator configured to change the illumination of at least one region of the image based on the at least one indicator of the power characteristic.

The image processor may further comprise a region of interest determiner configured to determine at least one region of the image wherein the illumination modulator may be configured to change the illumination of the at least one region of the image determined by the region of interest determiner.

The image processor may further comprise a motion estimator configured to estimate a motion value of a region between the image and at least one of a previous image and a successive image.

The motion estimator may comprise at least one of: a x-axis motion vector determiner configured to determine a x-axis motion vector of the at least one region between the image and the at least one of the previous image and the successive image; a y-axis motion vector determiner configured to determine a y-axis motion vector of the at least one region between the image and the at least one of the previous image and the successive image; and an absolute motion vector determiner configured to determine an absolute motion vector of the at least one region between the image and the at least one of the previous image and the successive image.

The region of interest determiner may further comprise at least one of: a temporal filter configured to temporally smooth the motion value of the region between the image and the at least one of the previous image and the successive image; and a spatial filter configured to spatially smooth the motion value of the region between the image and the at least one of the previous image and the successive image.

The illumination modulator may be configured to change the illumination of the at least one region of the image further based on the motion value of the at least one region.

The region of interest determiner may be configured to determine at least one region comprising at least one of: a defined shape; a defined object; an object moving at a defined velocity; an object moving with a defined trajectory; a body; a face; an edge; and a corner.

The illumination modulator may be further configured to change the illumination of the at least one region of the image based on of an average motion between the image and the at least one of the previous image and the successive image.

An apparatus may comprise: the image processing arrangement as described herein; a power source configured to supply power to at least the image processing arrangement; and an apparatus monitor configured to monitor the power source and determine the at least one indicator of the power characteristic.

The at least one indicator of a power characteristic may comprise at least one of: a power capacity of the power source; and an estimated power requirement of the apparatus.

According to another aspect of the disclosure there is provided a method for image processing comprising: receiving at least one indicator of a power characteristic related to the image processing; and processing an image based on the at least one indicator of the power characteristic.

Processing the image may comprise geometrically modulating the image based on the at least one indicator of the power characteristic.

Geometrically modulating may further comprise determining a geometric scale factor based on the at least one indicator of the power characteristic, wherein geometrically modulating may comprise geometrically modulating the image based on the geometric scale factor.

Determining a geometric scale factor may comprise determining a geometric scale factor further based on at least one of: a minimum image size; a maximum rate of change of image size; and an original image size.

Processing the image may further comprise modulating the illumination of at least one region of the image based on the at least one indicator of the power characteristic.

Modulating the illumination of at least one region of the image may comprise determining at least one region of the image and modulating the illumination of the determined at least one region of the image.

Processing the image may further comprise estimating a motion value of a region between the image and at least one of a previous image and a successive image.

Estimating the motion value may comprise at least one of: determining a x-axis motion vector of the at least one region between the image and the at least one of the previous image and the successive image; determining a y-axis motion vector of the at least one region between the image and the at least one of the previous image and the successive image; and determining an absolute motion vector of the at least one region between the image and the at least one of the previous image and the successive image.

Determining the region of interest may further comprise at least one of: temporally smoothing the motion value of the region between the image and the at least one of the previous image and the successive image; and spatially smoothing the motion value of the region between the image and the at least one of the previous image and the successive image.

Modulating the illumination may comprise modulating the illumination of the at least one region of the image further based on the motion value of the at least one region.

Determining the region of interest may comprise determining at least one region comprising at least one of: a defined shape; a defined object; an object moving at a defined velocity; an object moving with a defined trajectory; a body; a face; an edge; and a corner.

Modulating the illumination may further comprise modulating the illumination of the at least one region of the image based on an average motion between the image and the at least one of the previous image and the successive image.

The at least one indicator of a power characteristic may comprise at least one of: a power capacity of a power source and an estimated power requirement of an apparatus.

An electronic device may comprise the image processing arrangement as described herein.

A chipset may comprise the image processing arrangement as described herein.

According to another aspect of the disclosure there is provided a computer-readable medium encoded with instructions that, when executed by a computer, perform: receiving at least one indicator of a power characteristic related to the computer and processing an image based on the at least one indicator of the power characteristic.

Processing the image may comprise geometrically modulating the image based on the at least one indicator of the power characteristic.

Geometrically modulating may further comprise determining a geometric scale factor based on the at least one indicator of the power characteristic, wherein geometrically modulating may comprise geometrically modulating the image based on the geometric scale factor.

Determining a geometric scale factor may comprise determining a geometric scale factor further based on at least one of: a minimum image size; a maximum rate of change of image size; and an original image size.

Processing the image may further comprise modulating the illumination of at least one region of the image based on the at least one indicator of the power characteristic.

Modulating the illumination of at least one region of the image may comprise determining at least one region of the image and modulating the illumination of the at least one region of the image determined.

Processing the image may further comprise estimating a motion value of a region between the image and at least one of a previous image and a successive image.

Estimating the motion value may comprise at least one of: determining a x-axis motion vector of the at least one region between the image and the at least one of the previous image and the successive image; determining a y-axis motion vector of the at least one region between the image and the at least one of the previous image and the successive image; and determining an absolute motion vector of the at least one region between the image and the at least one of the previous image and the successive image.

Determining the region of interest may further comprise at least one of: temporally smoothing the motion value of the region between the image and the at least one of the previous image and the successive image and spatially smoothing the motion value of the region between the image and the at least one of the previous image and the successive image.

Modulating the illumination may comprise modulating the illumination of the at least one region of the image further based on the motion value of the at least one region.

Determining the region of interest may comprise determining at least one region comprising at least one of: a defined shape; a defined object; an object moving at a defined velocity; an object moving with a defined trajectory; a body; a face; an edge; and a corner.

Modulating the illumination may further comprise modulating the illumination of the at least one region of the image based on of an average motion between the image and the at least one of the previous image and the successive image.

The at least one indicator of a power characteristic may comprise at least one of: a power capacity of a power source and an estimated power requirement of an apparatus.

According to another aspect of the disclosure there is provided an apparatus comprising at least one processor and at least one memory including computer program code, the at least one memory and the computer program code configured to, with the at least one processor, cause the apparatus at least to perform: receiving at least one indicator of a power characteristic related to the apparatus and processing an image based on the at least one indicator of the power characteristic.

Processing the image may cause the apparatus to perform geometrically modulating the image based on the at least one indicator of the power characteristic.

Geometrically modulating may further cause the apparatus to perform determining a geometric scale factor based on the at least one indicator of the power characteristic, wherein geometrically modulating may cause the apparatus to perform geometrically modulating the image based on the geometric scale factor.

Determining a geometric scale factor may cause the apparatus to perform determining a geometric scale factor further based on at least one of: a minimum image size; a maximum rate of change of image size; and an original image size.

Processing the image may further cause the apparatus to perform modulating the illumination of at least one region of the image based on the at least one indicator of the power characteristic.

Modulating the illumination of at least one region of the image may cause the apparatus to perform determining at least one region of the image and modulating the illumination of the at least one region of the image determined.

Processing the image may further cause the apparatus to perform estimating a motion value of a region between the image and at least one of a previous image and a successive image.

Estimating the motion value may cause the apparatus to perform at least one of: determining a x-axis motion vector of the at least one region between the image and the at least one of the previous image and the successive image; determining a y-axis motion vector of the at least one region between the image and the at least one of the previous image and the successive image; and determining an absolute motion vector of the at least one region between the image and the at least one of the previous image and the successive image.

Determining the region of interest may further cause the apparatus to perform at least one of: temporally smoothing the motion value of the region between the image and the at least one of the previous image and the successive image; and spatially smoothing the motion value of the region between the image and the at least one of the previous image and the successive image.

Modulating the illumination may further cause the apparatus to perform modulating the illumination of the at least one region of the image further based on the motion value of the at least one region.

Determining the region of interest may cause the apparatus to perform determining at least one region comprising at least one of: a defined shape; a defined object; an object moving at a defined velocity; an object moving with a defined trajectory; a body; a face; an edge; and a corner.

Modulating the illumination may further cause the apparatus to perform modulating the illumination of the at least one region of the image based on an average motion between the image and the at least one of the previous image and the successive image.

The at least one indicator of a power characteristic may comprise at least one of: a power capacity of a power source; and an estimated power requirement of the apparatus.

According to another aspect of the disclosure there is provided an image processing arrangement comprising: input means for receiving at least one indicator of a power characteristic related to the image processing arrangement and processor means for processing an image based on the at least one indicator of the power characteristic.

The processor means may comprise geometric modulating means for geometrically modulating the image based on the at least one indicator of the power characteristic.

The geometric modulating means may further comprise a geometric scaling means for determining a geometric scale factor based on the at least one indicator of the power characteristic, wherein the geometric modulating means geometrically modulates the image based on the geometric scale factor.

The geometric scaling means may be configured to determine the geometric scale factor further based on at least one of: a minimum image size; a maximum rate of change of image size; and an original image size.

The processor means may comprise an illumination modulator means for changing the illumination of at least one region of the image based on the at least one indicator of the power characteristic.

The processor means may further comprise region determiner means for determining at least one region of the image; wherein the illumination modulator means may be configured to change the illumination of the at least one region of the image determined by the region determiner means.

The processor means may further comprise motion estimation means for estimating a motion value of a region between the image and at least one of a previous image and a successive image.

The motion estimator means may comprise at least one of: a x-axis motion vector determiner configured to determine a x-axis motion vector of the at least one region between the image and the at least one of the previous image and the successive image; a y-axis motion vector determiner configured to determine a y-axis motion vector of the at least one region between the image and the at least one of the previous image and the successive image; and an absolute motion vector determiner configured to determine an absolute motion vector of the at least one region between the image and the at least one of the previous image and the successive image.

The region determiner means may further comprise at least one of: a temporal filter configured to temporally smooth the motion value of the region between the image and the at least one of the previous image and the successive image and a spatial filter configured to spatially smooth the motion value of the region between the image and the at least one of the previous image and the successive image.

The illumination modulator means may be configured to change the illumination of the at least one region of the image further based on the motion value of the at least one region.

The region determiner means may be configured to determine at least one region comprising at least one of: a defined shape; a defined object; an object moving at a defined velocity; an object moving with a defined trajectory; a body; a face; an edge; and a corner.

The illumination modulation means may be further configured to change the illumination of the at least one region of the image based on an average motion between the image and the at least one of the previous image and the successive image.

An apparatus may comprise: the processor means as described herein; power means for supplying power to at least processor means; and monitor means for monitoring the power means and determining the at least one indicator of the power characteristic.

The at least one indicator of a power characteristic may comprise at least one of: a power capacity of the power source and an estimated power requirement of the apparatus.

BRIEF DESCRIPTION OF THE DRAWINGS

For better understanding of the present application, reference will now be made by way of example to the accompanying drawings in which.

DETAILED DESCRIPTION

The following describes in further detail suitable apparatus and possible mechanisms for the provision of power management for a display within a battery powered electronic device.

Figure 1:
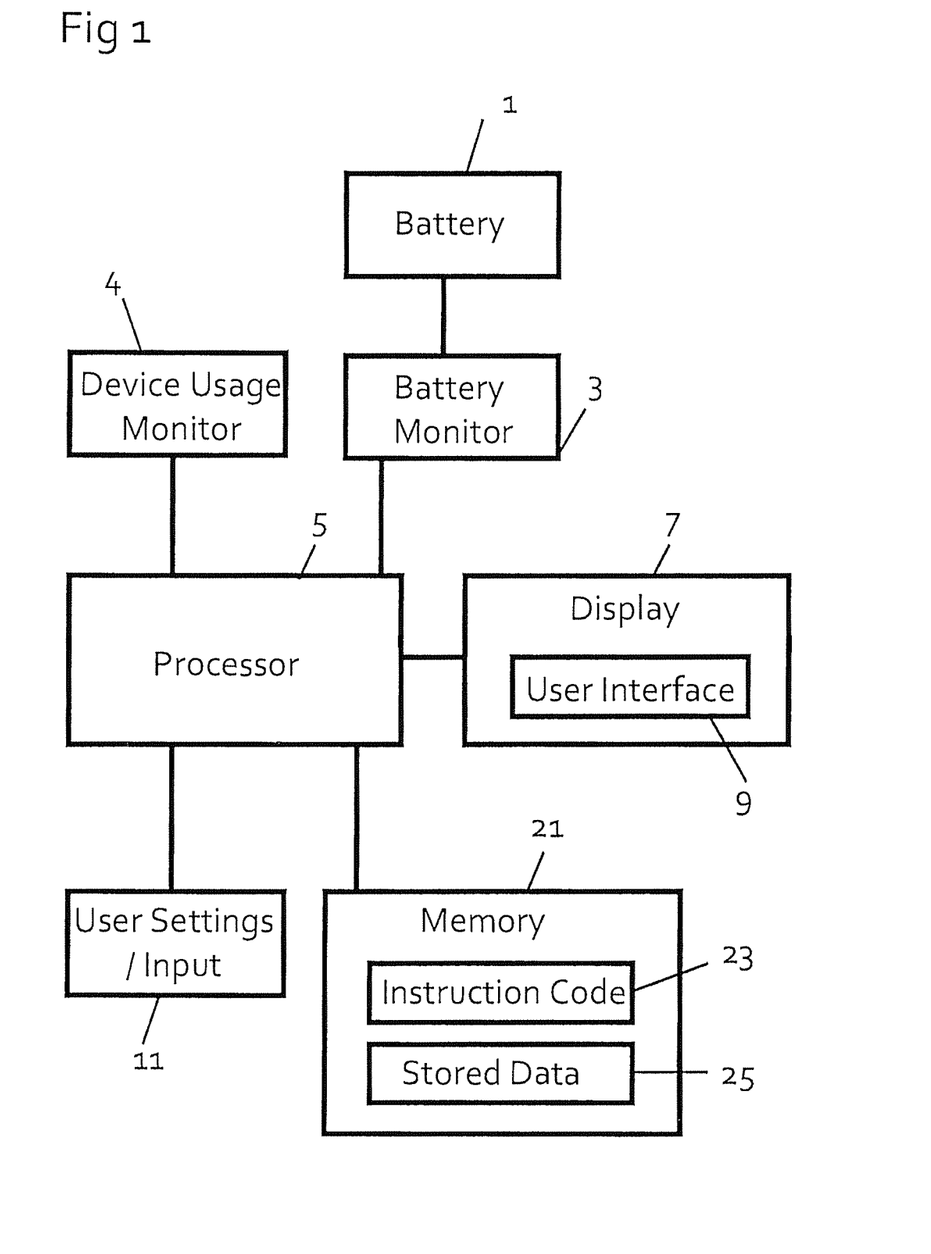
FIG. 1 shows schematically an electronic device according to some embodiments of the application.

With respect to FIG. 1, an example electronic device or apparatus 10 is shown within which embodiments of the application can be implemented. The apparatus 10 can, in some embodiments, be a mobile terminal or user equipment for a wireless communications system. The apparatus, in some other embodiments, can be a portable media device (for example a digital music player or MP3 player). In some other embodiments the apparatus 10 can be a media player (for example a MP4 player). Furthermore the apparatus in some embodiments can be any suitable portable electronic device, for example an audio or video recording apparatus with suitable display, a portable games console with a display, an electronic calendar, network browser, portable workout manager, or portable or personal computer. The apparatus 10 can, in some embodiments, be a multifunction device that supports a plurality of different functions.

The apparatus 10, in some embodiments, comprises a processor 5 which can be configured to execute various program codes. The implemented program codes can comprise display power management code or routines. The implemented program codes can be stored within a suitable memory.

In some embodiments the processor 5 can be coupled to memory 21. The memory 21 can further comprise an instruction code section 23 suitable for storing program codes implementable upon the processor. Furthermore in some embodiments the memory 21 can comprise a stored data section 25 for storing data, for example predefined user settings, power consumption profiles display image information, etc. The memory 21 can be any suitable storage means. In some embodiments the memory 21 can be implemented as part of the processor in a system-on-chip configuration.

The apparatus 10 can further comprise a battery 1. The battery 1 can be any suitable electrical power storage means. In some embodiments the battery 1 is rechargeable by coupling the battery 1 to an alternating current (AC) or mains outlet to allow a charger circuit (not shown) to charge the battery 1. In other embodiments the battery 1 can be any suitable electrical charge storage means and/or portable electrical generating means, for example an ultra capacitor, a fuel cell, a solar voltaic power device, etc.

The apparatus can also comprise a battery monitor 3 that is coupled to the processor 5 and configured to provide the processor 5 with information relating to the condition of the battery 1. The battery monitor 3 can, for example, provide the processor with an indication of the battery condition, which can be expressed by one or more battery characteristic or characteristic values such as charge level, temperature, voltage, and current.

In some embodiments the apparatus further comprises a device usage monitor 4. The device usage monitor 4 operates to monitor the present, imminent or future use of the apparatus. The device usage monitor 4 can thus, alone or in combination with the information regarding the condition of the battery, provide information suitable for power management apparatus. In some embodiments the battery monitor 3 and device usage monitor 4 can be implemented as program code or routines operating on the processor 5.

The apparatus 10 can further comprise a display 7. The display can be any suitable display means featuring technology, for example cathode ray tube (CRT), light emitting diode (LED), variably backlight liquid crystal display (LCD) for example LED lit LCD, organic light emitting diode (OLED), and plasma display. The display 7 can furthermore be considered to provide a graphical user interface (GUI) 9 providing a dialog window in which a user can implement and input how the apparatus 10 implements display power management.

The apparatus 10 further can comprise a user input or user settings input apparatus 11. The user input can in some embodiments be a series of buttons, switches or adjustable elements providing an input to the processor 5. In some embodiments the user input 11 and display 7 can be combined as a touch sensitive surface on the display, also known as a touch screen or touch display apparatus.

Figure 2:
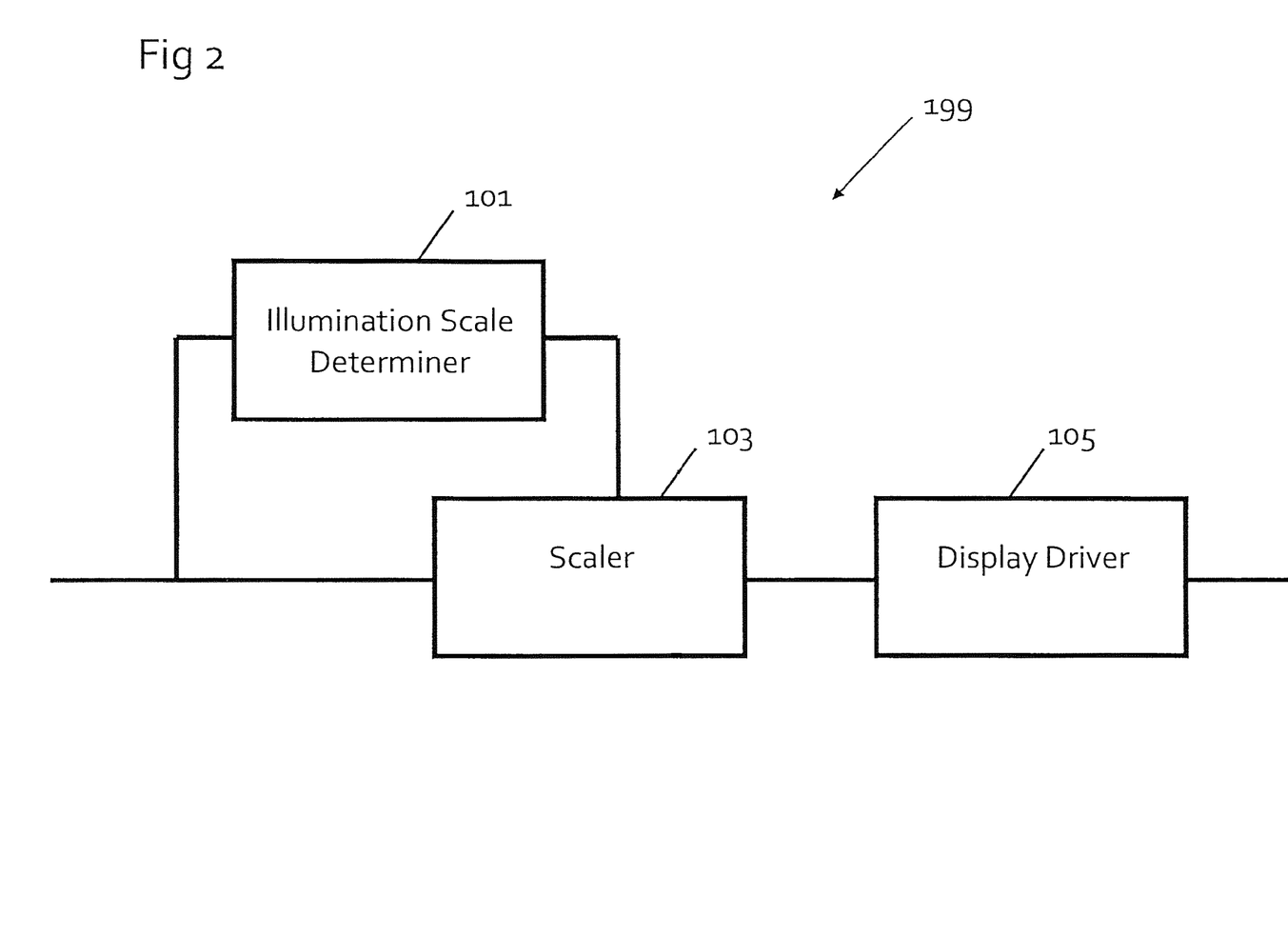
FIG. 2 shows schematically display power management apparatus according to some embodiments of the application.
Figure 3:
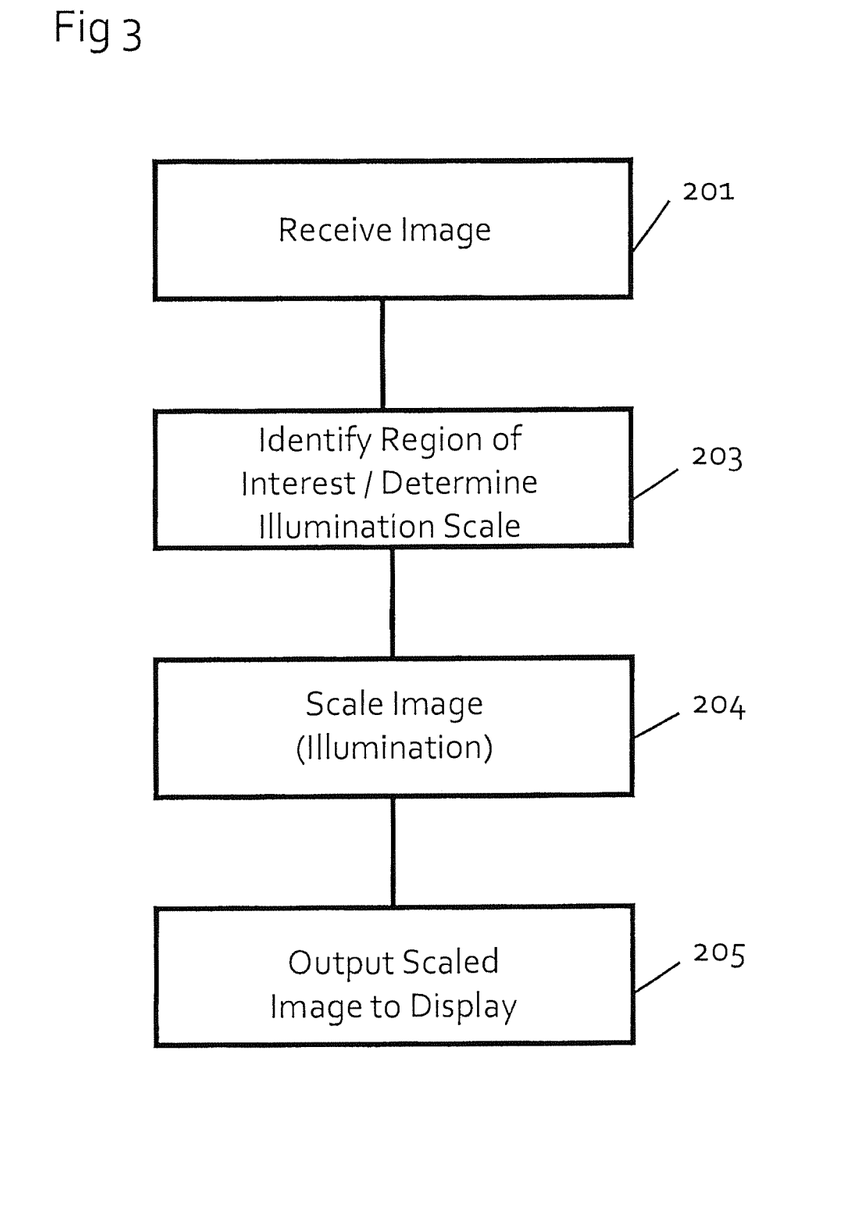
FIG. 3 shows schematically a method of operation of the display power management apparatus as shown in FIG. 2 according to some embodiments of the application.

With respect to FIGS. 2 and 3, an overview of display power management apparatus and operation of display power management apparatus according to some embodiments is shown. The display power management apparatus 199 attempts to differentially illuminate various regions of the display, for example video scenes or images to produce an average decrease in power consumption. In some embodiments the display power management apparatus 199 can be implemented as code or routines operating on the processor 5 and stored on memory 21, however it would be appreciated by one skilled in the art that the display power management apparatus can be implemented at least partially in hardware, for example within a field programmable gate array (FPGA), an application specific integrated circuit or similar hardware.

The display power management apparatus in some embodiments can comprise a region of interest determiner or image processing means configured to analyse an image or video scene to identify regions of interest to which a higher illumination value is associated compared with an illumination value associated with regions of non-interest. In some embodiments a "region of interest", or "area or interest" in an image from a video scene can be a region of high motion. In other words a region of interest is one which is likely to attract the "eye" of the user. However in some other embodiments a "region of interest" can be a predefined or determined shape such as a face, an edge or a corner.

With respect to FIG. 2 the display power management apparatus 199 comprises an illumination scale determiner 101 configured to receive an image to be displayed and is configured to output a control signal to a scaler 103.

The operation of receiving the image is shown in FIG. 3 by step 201.

The operation of identifying a region of interest/determining the illumination scale factor is shown in FIG. 3 by step 203.

The display power management apparatus 199 further comprises a scaler 103, dynamic scaler or any suitable means for dynamically scaling an image, which is further coupled to receive the image to be displayed and the control signal from the illumination scale determiner 101. The image can in some embodiments be processed by the scaler 103 according to the control signal to apply a differential illumination processing.

The operation of scaling the image with respect to illumination is shown in FIG. 3 by step 204.

The display management apparatus 199 further comprises a display driver 105 which is coupled to the scaler 103 and configured to output the image to the display in a suitable format. In some embodiments the display driver 105 can furthermore perform post-processing of the scaled image to attempt to improve the processed image.

The step of outputting the scaled image to the display, generating the drive signal, is shown in FIG. 3 by step 205.

Figure 4:
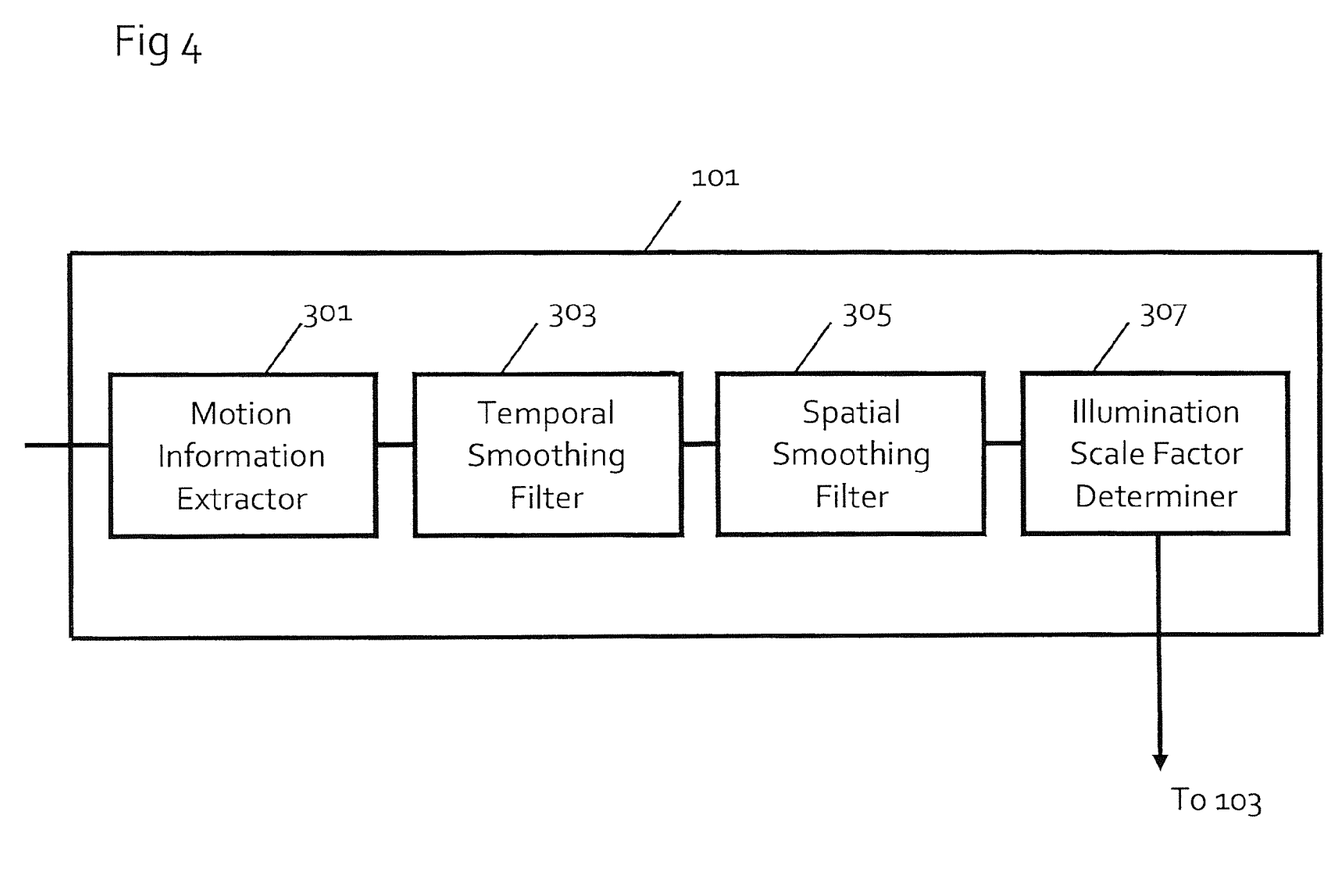
FIG. 4 shows schematically the illumination scale determiner in further detail according to some embodiments of the application.

With respect to FIG. 4 an illumination scale determiner 101 according to some embodiments is shown in further detail. Furthermore with respect to FIG. 5 the operation of the illumination scale determiner 101 is described. The illumination scale determiner 101 as described above receives an image, for example an encoded image or frame of a video scene and identifies or determines relevant regions of interest within the image or frame. The determined region of interest can then be used to increase the illumination for this region of interest relative to the other regions. In some embodiments as described previously the motion or speed of the motion identifies an area as an area of interest.

The illumination scale determiner 101 in some embodiments comprises a motion information extractor 301. The motion information extractor 301 is configured to receive the image, for example from a memory 21 (as shown in FIG. 1, for example a stored data section 25 of the memory 21), and extract motion information for regions of the image or frame.

In some embodiments the motion information extractor 301 is configured to determine motion information for image regions from only a single direction. For example the motion information extractor 301 can be configured to determine the motion vector of a macroblock in the current frame with regards to a reference frame (or previous frame/image) for the x-axis only. The determination of the x-axis motion vector can provide an accurate estimation of the motion of the image as typically motion in video sequences is horizontal in nature. In some other embodiments the motion information extractor 301 can be configured to determine the absolute motion vector of a macroblock in the current frame with regards to a reference frame.

The motion information extractor 301 is configured in some embodiments to output the motion information parameter values to a temporal smoothing filter 303.

Figure 5:
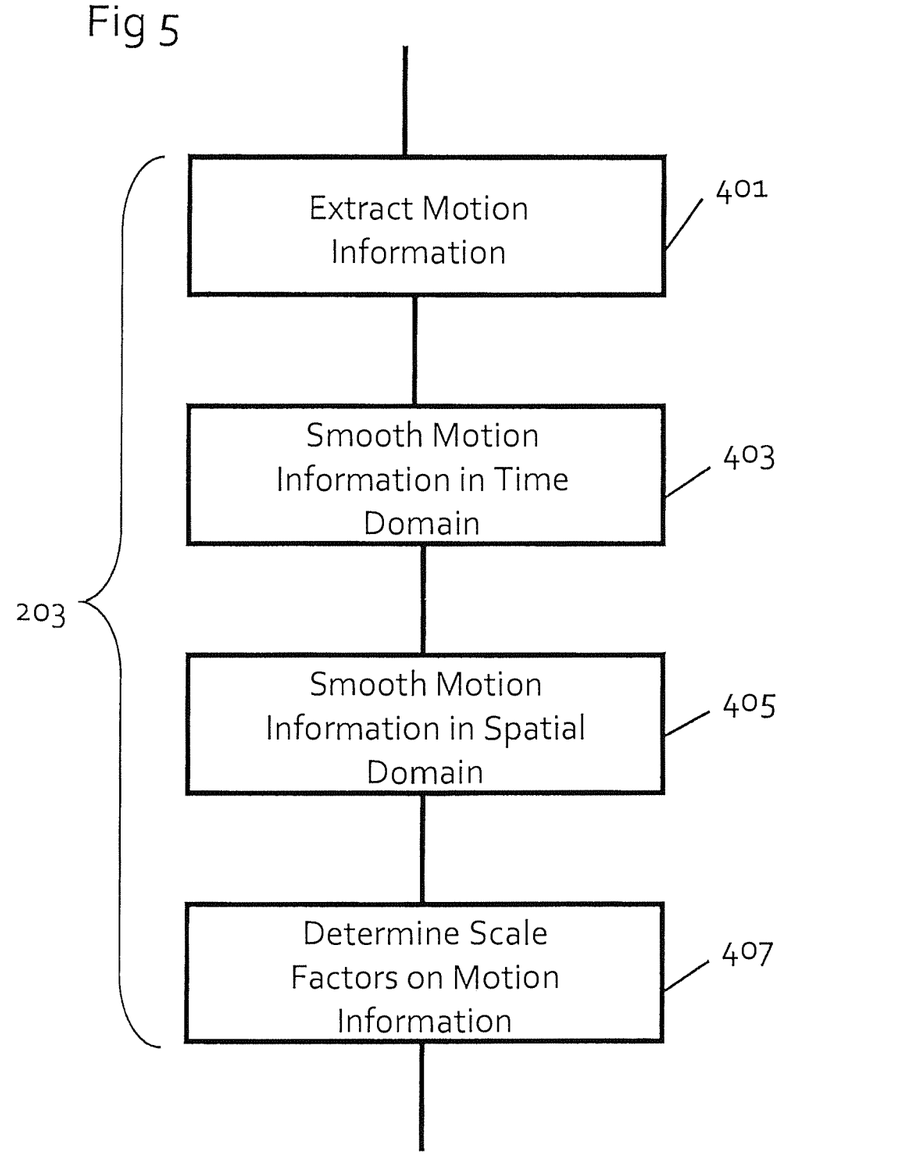
FIG. 5 shows the method of operating the illumination scale determiner according to some embodiments of the application.

The operation of extracting motion information is shown in FIG. 5 by step 401.

The illumination scale determiner 101 can, in further embodiments, comprise a temporal smoothing filter 303. The temporal smoothing filter 303 is configured to be coupled to the output of the motion information extractor 301 to receive the motion information parameter values, such as the determined motion vectors for macroblocks of the image.

The temporal smoothing filter can be any suitable means for ensuring or attempting to achieve continuity of motion information with respect to previous frames. For example the temporal smoothing filter 303 in some embodiments can be a first order infinite impulse response (IIR) filter such as described mathematically by:

$$mv\_filtered(i,j,n) = alpha * mv\_filtered(i,j,n-1) + beta * mv(i,j,n)$$

Where i=row index of the macroblock, j=the column index of the macroblock, n is the frame number, alpha is the temporal weighting factor which is in the range of between 0 and 1, and beta is 1-alpha. In some embodiments the temporal smoothing filter 303 can further be used to produce a normalised output in order to maintain the filtered output within an acceptable range. In such embodiments the maximum possible value of a motion vector is used as a normalisation factor. The maximum possible value of a motion vector is typically predefined according to the image or frame being processed and displayed. The output of the temporal smoothing filter 303 can be passed to a spatial smoothing filter 305.

The smoothing of the motion information in the temporal domain is shown in FIG. 5 by step 403.

The illumination scale determiner 101 in some embodiments further comprises a spatial smoothing filter 305. The spatial smoothing filter 305 receives the Output of the temporal smoothing filter 303 and is configured to attempt to maintain spatial continuity of the motion information parameter values with respect to neighbouring regions of the frame.

In some embodiments the spatial smoothing filter 305 can comprise an equally weighted moving average filtered motion vector values for the current macroblock being processed and neighbouring left, top and top-left macroblock motion vectors obtained from the temporal smoothing filter 303.

The smoothing of the motion information in the spatial domain is shown in FIG. 5 by step 405.

It would be understood by one skilled in the art that in some embodiments the motion vector values and in general the motion information can be passed directly from the motion information extractor to the illumination scale factor determiner without filtering or only one of temporal and spatial filtering.

The output of the spatial smoothing filter can then, in some embodiments, be passed to the illumination scale factor determiner 307. The illumination scale determiner 101 in some embodiments comprises an illumination scale factor determiner 307 configured to receive the smoothed filtered motion information data and determine a scale factor. Furthermore in some embodiments the illumination scale factor determiner 307 can further receive inputs from the battery monitor 3 and device usage monitor 4, both shown in FIG. 1, to modify the illumination scale factor calculation. For example in some embodiments a scale factor for a macroblock within an image could be determined using the following pseudo code.

```
If (weight <= 0.5)
    scale_factor = a * weight + (1 - a)*(1 - weight) + weight;
else
    scale_factor = a * weight + (1 - a)*(1 - weight) + (1 - weight);
``` where weight equals the power saving index determined from the power management variables which can be determined from the parameters from the battery monitor 3 and the device usage monitor 4, shown in FIG. 1, and a equals the smoothed motion information parameter. In some embodiments, image frames can be classified into 'high' motion content or 'low' motion content types based on motion vector information in the frame. In such embodiments in a high motion frame, the illumination scale factor determiner 307 can receive an input from the battery monitor and set the 'weight' value slightly higher than 0.5 if a reduction in power consumption is not greatly required and set the 'weight' value near to 1 if power consumption needs to be greatly reduced.

Similarly, in a 'low' motion frame the battery condition monitor input can further influence the setting of the weight such that a minor reduction in power consumption requires the setting of the 'weight' value to a value a little lower than 0.5 whereas a major reduction requires the setting of the 'weight' factor near to 0.

Although the embodiment demonstrated above identifies the region of interest as high motion (e.g. sport scenes) or low motion (e.g. newscast scenes) regions, it is by no means limited to these and embodiments could apply equally well to regions of interest identified by other methods (e.g. face detection, object identification, image classifier, etc.) as described later.

The scale factor can be output by the illumination scale factor determiner 307 to the scaler 103. The determination of scale factors based on the motion information is shown in FIG. 5 by step 407.

According to some embodiments the illumination scale factors can then be used by the scaler 103 such that each macroblock is dynamically illuminated according to the value of the scale factor associated with the nnacroblock.

In some embodiments the display driver 105 as discussed above can be configured to further carry out post-processing. For example the display driver 105 can carry out a de-blocking operation on the scaled macroblocks. The de-blocking filter is a spatial filter, for example, suitable for performing edge smoothing of the illumination levels for a "current" macroblock with respect to "top" and "left" macroblocks in order to remove visual discontinuity which can arise from differential illumination scaling.

Figure 6:
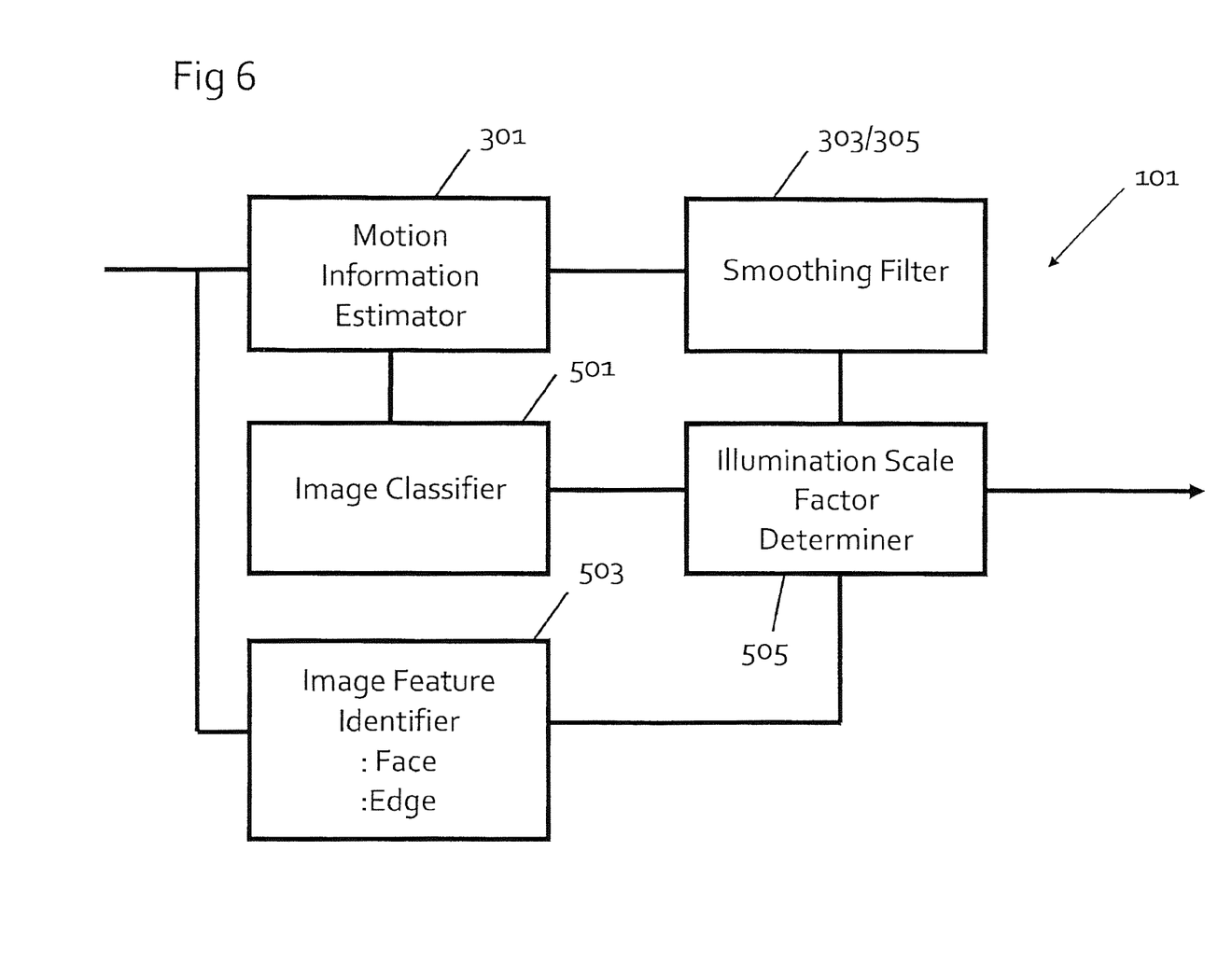
FIG. 6 shows a further illumination scale determiner according to some embodiments of the application.
Figure 7:
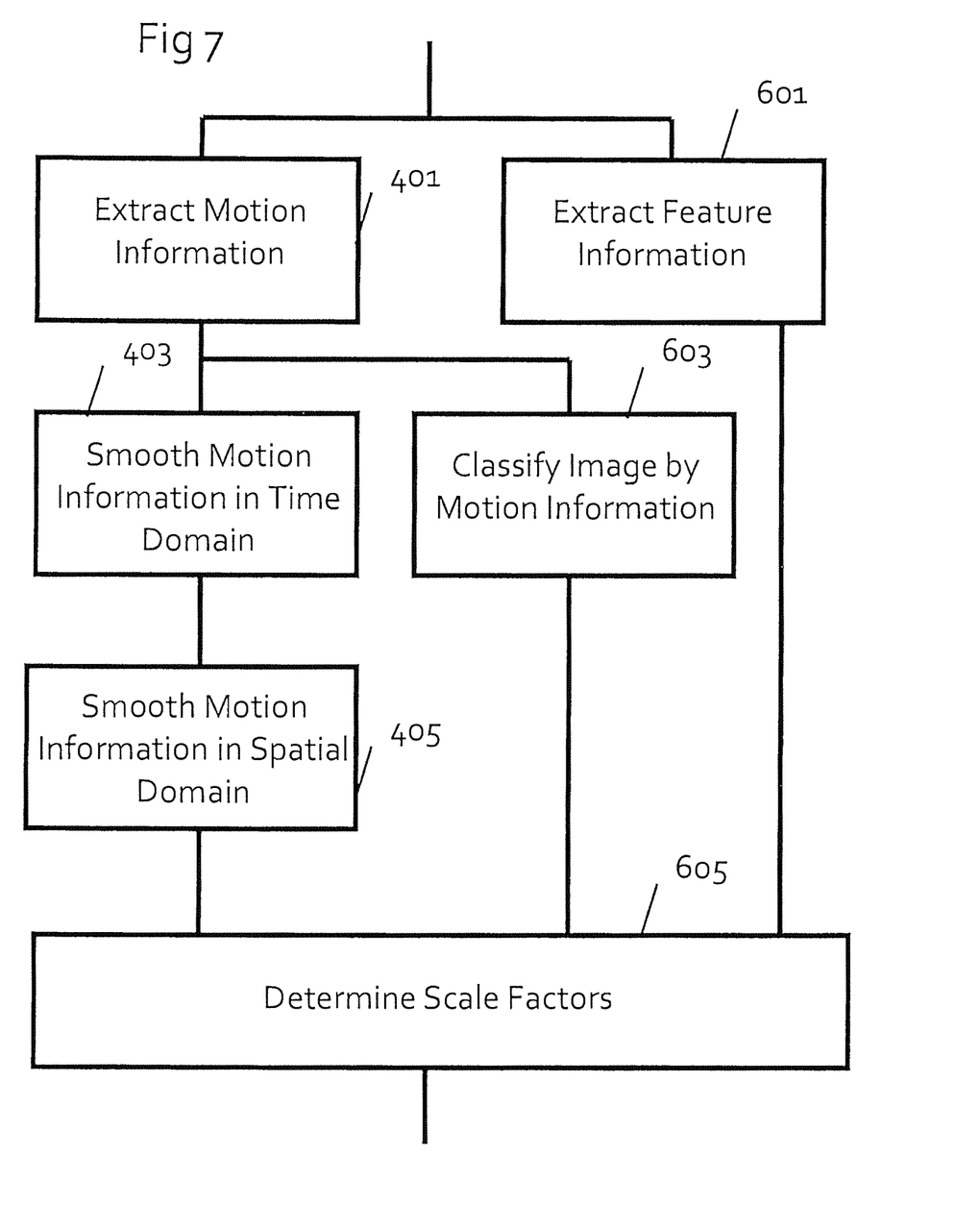
FIG. 7 shows schematically the operation of the further illumination scale determiner as shown in FIG. 6 according to some embodiments of the application.

With respect to FIGS. 6 and 7 a further example of the illumination scale determiner 101 is shown in further detail. The illumination scale determiner 101 shown in FIG. 6 of which the operation is shown in FIG. 7 differs from the illumination scale determiner shown in FIGS. 4 and 5 in that the illumination scale factor is determined not only on the motion information estimation of each macroblock but also on the degree of motion/stillness in a frame, the classification of the image, and whether the image features any desired image features, for example a face, edge, corner or any suitable shape.

The illumination scale determiner 101 shown in FIG. 6 thus comprises a motion information estimator 301 which is configured to receive the image data, determine motion information in a manner similar to the motion information estimator 301 and output the determined motion information characteristic values to a smoothing filter 303/305 and to an image classifier 501.

The operation of extracting the motion information is shown in FIG. 7 by step 401.

The illumination scale determiner 101 of FIG. 6 further comprises a smoothing filter 303/305. The smoothing filter 303/305 is configured to perform the operations of both temporal and spatial filtering of the motion information estimation values in a manner similar to the temporal smoothing filter and spatial smoothing filters described previously in FIG. 4. The output of the smoothing filter 303/305 is passed to the illumination scale factor determiner 505.

The operation of smoothing motion information in the time domain is shown by step 403 in FIG. 7.

The operation of smoothing motion information in the spatial domain is shown in FIG. 7 by step 405.

In some embodiments the illumination scale determiner 101 can further comprise an image classifier 501. The image classifier 501 is coupled to the motion information extractor/estimator 301 and configured to receive the motion information estimation values. The image classifier 501 is configured to process the motion information estimate values to classify the image according to the overall motion of the image. Thus in some embodiments the image classifier 501 can classify the image as a "still image" where the summed or average motion information parameter values are less than a predetermined value and a "fast image" when the summed or average motion information parameter values for the frame are greater than or equal to a further predetermined threshold value. The image classifier 501 can then be configured to output the determined image classification value to the illumination scale factor determiner 505.

It will be understood that the classification value in some embodiments can be a discrete value as indicated above, a continuous value or a range limited continuous value.

The operation of classifying the image by motion information is shown in FIG. 7 by step 603.

The illumination scale determiner 101 furthermore comprises, in some embodiments, an image feature identifier 503 configured to receive the image and determine whether a macroblock or a group of macroblocks comprise a desired feature. In some embodiments a desired feature can be a face, edge, corner or any suitable feature. Other examples of suitable features which can in some embodiments be identified can be human body detection, object recognition, detection of velocity of moving objects, and specific motion trajectories of objects. The image feature identifier outputs for each macroblock or group of macroblocks associated with a desired feature an indicator to the illumination scale factor determiner 505. In some embodiments the image feature identifier output represents the confidence level that the macroblock or group of macroblocks comprises at least one of the desired features.

The extraction of feature information is shown in FIG. 7 by step 601.

The illumination scale determiner 101 furthermore comprises a scale factor determiner 505. The illumination scale factor determiner 505 is configured to receive the motion information values, the classified image value, and the featured image macroblock indicators. The illumination scale factor determiner 505, in some embodiments, can furthermore receive additional inputs with respect to power management elements from the device usage monitor 4 and battery monitor 3, shown in FIG. 1, to assist the generation of the illumination scale factor.

In some embodiments the scale factor can be determined based on a weighted function of the motion information values and feature identifier values whereby the weighting function is derived by the image classifier determining a greater contribution to the "weight" value to the feature identifier value in "still" images and a greater contribution to the "weight" value to the motion information values in moving images. In some other embodiments of the application the illumination scale factor determiner 505 generates the scale factor based on either the motion information values or the image feature values whereby the illumination scale factor determiner performs a switching based on the classified image value.

The operation of determining the scale factors is shown in FIG. 7 by step 605.

Figure 8:
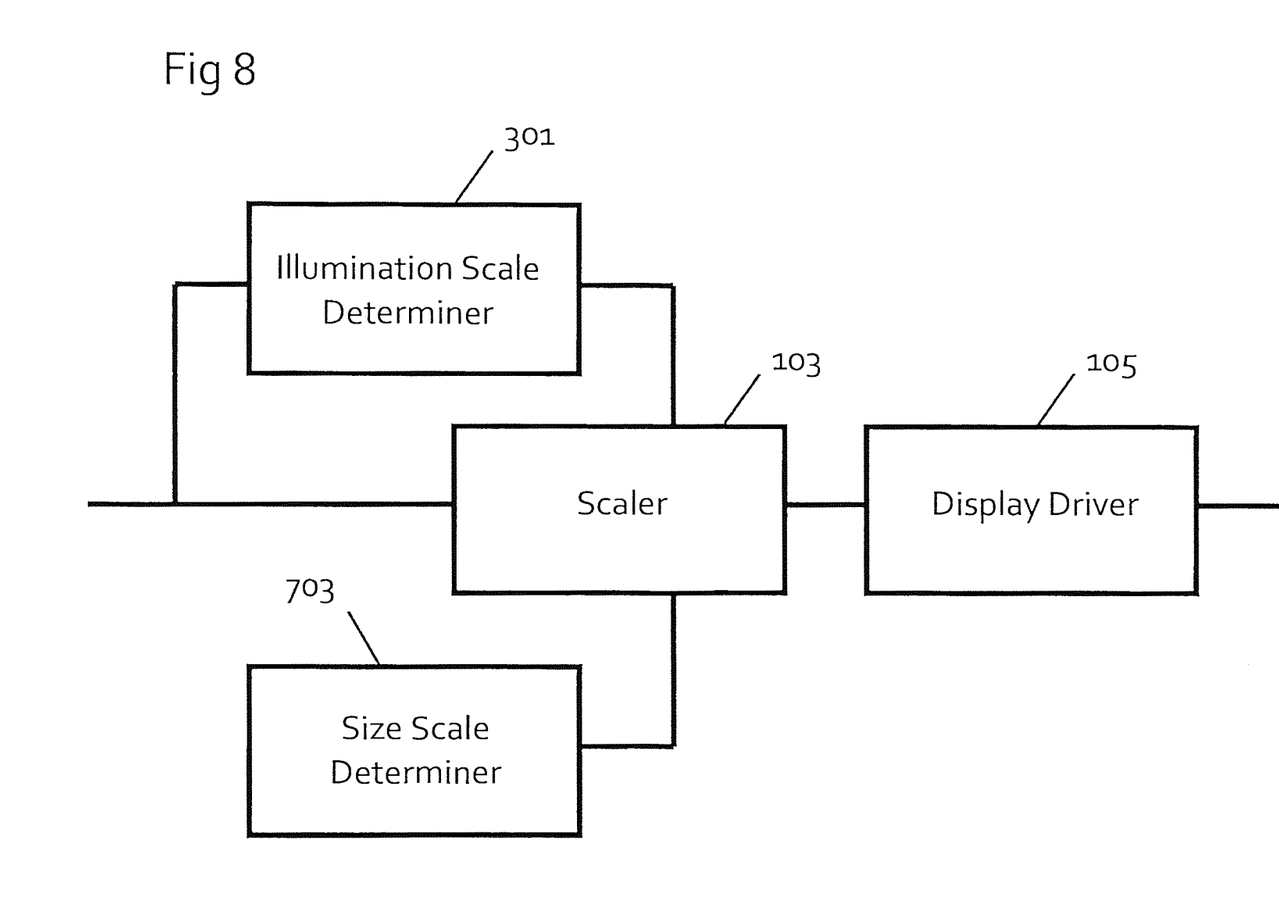
FIG. 8 shows a further display power management apparatus according to some embodiments of the application.

With respect to FIG. 8, a further display power management apparatus is shown according to some embodiments of the application including display driver 105 and illumination scale determiner 301. The display power management apparatus further differs from the apparatus shown in FIG. 2 by comprising a size scale determiner 703 which is configured to output to the scaler 103 a value by which the image is to be size scaled on the display.

Figure 9:
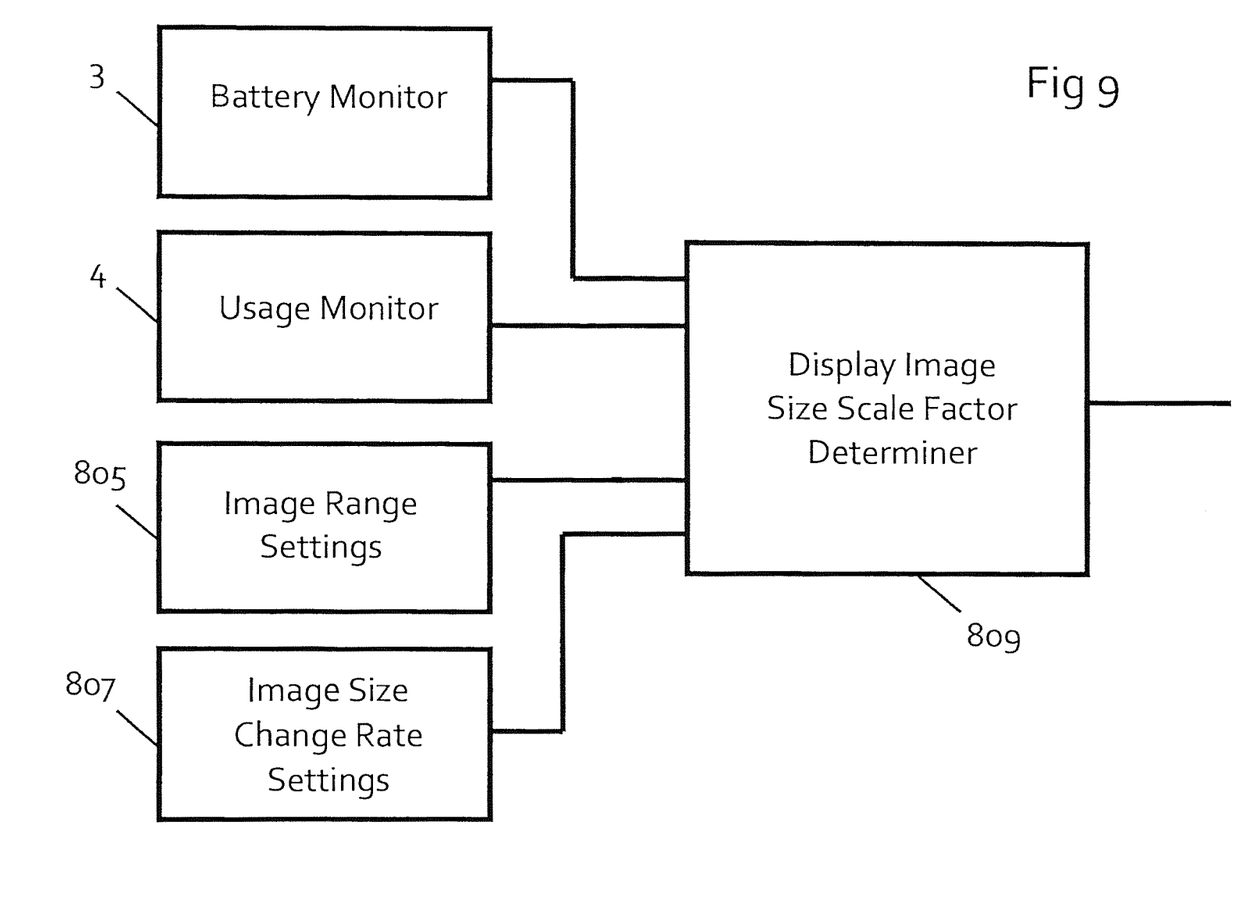
FIG. 9 shows schematically the size scale determiner shown in FIG. 8 in further detail.

With respect to FIG. 9 the size scale determiner 703 of FIG. 8 is shown in further detail. The size scale determiner 703 is shown receiving information from the battery monitor 3 on the rate of discharge of the battery and a tracked or filtered battery discharge value. Furthermore the size scale determiner 703 is configured to receive power requirement estimation from the device usage monitor 4 components estimating the requirement of the power based on the usage.

Furthermore in some embodiments the scale size determiner 703 receives an image range setting 805 which indicates at least a minimum image size to the display image size scale factor determiner 809, or temporally dynamic size scale factor determiner. In some embodiments these values can be generated automatically, manually or semi-automatically (in other words the user selecting from a range of pre-determined values).

Furthermore in some embodiments the size scale determiner 703 receives an image size change rate setting 807 which indicates the maximum rate of change available to the display image size scale factor determiner 809.

The display image size scale factor determiner 809 thus can be configured to compare the current power requirement with the battery capacity, and as the battery capacity relative to the power requirements reaches a predetermined value determine a display image size scale factor which adaptively reduces the size of the image relative to the original size. The rate of change of the adaptive size is determined based on the image size change rate settings 807 and the minimum size is determined by the image range setting 805.

The scaler 103 can, in some embodiments, use the size scale determiner value to perform a letterbox filtering on the image to output a display image of a suitable size. In some further embodiments the scaler 103 can perform a downsampling filtering on the image to output a display image of a suitable size without losing the original aspect ratio of the image. As the display is a major consumer of power this thus saves power by using a smaller active display area. This is particularly useful in active displays for example active matrix organic light emitting diode technology (AMOLED). Where, for example halving the playback resolution should roughly reduce power consumption by a factor of 4. It would be appreciated by one skilled in the art that in some embodiments the dynamic size scaling of the image is implemented without the illumination scaling. For example size only scaling can be implemented in some embodiments to further reduce the power consumption of determining regions of interest.

The electronic device 10 may, for example, be a mobile terminal or user equipment of a wireless communication system.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as, for example, DVD and the data variants thereof.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys®, Inc. of Mountain View, Calif. and Cadence® design platform, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

We claim:

1. An image processing arrangement comprising:
   an input configured to receive at least one indicator of a power characteristic related to the image processing arrangement; and
   an image processor configured to process an image based on the at least one indicator of the power characteristic, wherein the image processing arrangement is configured for modulating regions of a display based on an identified region of interest within an image being displayed, wherein the modulation occurs independently for different regions of the display and wherein the modulation is based off of motion identified in the displayed image.

2. The image processing arrangement as claimed in claim 1, wherein the image processor comprises a geometric modulator configured to geometrically modulate the image based on the at least one indicator of the power characteristic.

3. The image processing arrangement as claimed in claim 2, wherein the geometric modulator further comprises a geometric scale factor determiner configured to determine a geometric scale factor based on the at least one indicator of the power characteristic, wherein the geometric modulator is configured to geometrically modulate the image based on the geometric scale factor.

4. The image processing arrangement as claimed in claim 3, wherein the geometric scale factor determiner is configured to determine a geometric scale factor further based on at least one of:
- a minimum image size;
- a maximum rate of change of image size; and
- an original image size.

5. The image processing arrangement as claimed in claim 1, wherein the image processor comprises an illumination modulator configured to change the illumination of at least one region of the image based on the at least one indicator of the power characteristic.

6. The image processing arrangement as claimed in claim 5, wherein the image processor further comprises a region of interest determiner configured to determine at least one region of the image; and wherein the illumination modulator is configured to change the illumination of the at least one region of the image determined by the region of interest determiner.

7. The image processing arrangement as claimed in claim 6, wherein the image processor further comprises a motion estimator configured to estimate a motion value of a region between the image and at least one of a previous image and a successive image.

8. The image processing arrangement as claimed in claim 7, wherein the motion estimator comprises at least one of:
- an x-axis motion vector determiner configured to determine an x-axis motion vector of the at least one region between the image and the at least one of the previous image and the successive image;
- a y-axis motion vector determiner configured to determine a y-axis motion vector of the at least one region between the image and the at least one of the previous image and the successive image; and
- an absolute motion vector determiner configured to determine an absolute motion vector of the at least one region between the image and the at least one of the previous image and the successive image.

9. The image processing arrangement as claimed in claim 7, wherein the region of interest determiner further comprises at least one of:
- a temporal filter configured to temporally smooth the motion value of the region between the image and the at least one of the previous image and the successive image; and
- a spatial filter configured to spatially smooth the motion value of the region between the image and the at least one of the previous image and successive image.

10. The image processing arrangement as claimed in claim 7, wherein the illumination modulator is configured to change the illumination of the at least one region of the image further based on the motion value of the at least one region.

11. The image processing arrangement as claimed in claim 6, wherein the region of interest determiner is configured to determine at least one region comprising at least one of:
- a defined shape;
- a defined object;
- an object moving at a defined velocity;
- an object moving with a defined trajectory;
- a body;
- a face;
- an edge; and
- a corner.

12. The image processing arrangement as claimed in claim 5, wherein the illumination modulator is further configured to change the illumination of the at least one region of the image based on an average motion between the image and the at least one of the previous image and the successive image.

13. An apparatus comprising:
- the image processing arrangement as claimed in claim 1;
- a power source configured to supply power to at least the image processing arrangement; and
- an apparatus monitor configured to monitor the power source and determine the at least one indicator of the power characteristic.

14. The apparatus as claimed in claim 13, wherein the at least one indicator of a power characteristic comprises at least one of:
- a power capacity of the power source; and
- an estimated power requirement of the apparatus.

15. A method for image processing comprising:
- receiving at least one indicator of a power characteristic related to the image processing;
- processing an image based on the at least one indicator of the power characteristic; and
- modulating regions of a display based on an identified region of interest within an image being displayed, wherein the modulation occurs independently for different regions of the display and wherein the modulation is based off of motion identified in the displayed image.

16. The method as claimed in claim 15, wherein processing the image comprises geometrically modulating the image based on the at least one indicator of the power characteristic.

17. The method as claimed in claim 16, wherein geometrically modulating further comprises determining a geometric scale factor based on the at least one indicator of the power characteristic, wherein geometrically modulating comprises geometrically modulating the image based on the geometric scale factor.

18. The method as claimed in claim 17, wherein determining a geometric scale factor comprises determining a geometric scale factor further based on at least one of:
- a minimum image size;
- a maximum rate of change of image size; and
- an original image size.

19. The method as claimed in claim 15, wherein processing the image further comprises modulating the illumination of at least one region of the image based on the at least one indicator of the power characteristic.

20. The method as claimed in claim 19, wherein modulating the illumination of at least one region of the image comprises determining at least one region of the image and modulating the illumination of the at least one region of the image determined.

21. The method as claimed in claim 20, wherein processing the image further comprises estimating a motion value of a region between the image and at least one of a previous image and a successive image.

22. The method as claimed in claim 21, wherein estimating the motion value comprises at least one of:
- determining an x-axis motion vector of the at least one region between the image and the at least one of the previous image and the successive image;
- determining a y-axis motion vector of the at least one region between the image and the at least one of the previous image and the successive image; and determining an absolute motion vector of the at least one region between the image and the at least one of the previous image and the successive image.

23. The method as claimed in claim 21, wherein determining the region of interest further comprises at least one of:
   temporally smoothing the motion value of the region between the image and the at least one previous and/or successive image; and
   spatially smoothing the motion value of the region between the image and the at least one previous and/or successive image.

24. The method as claimed in claim 21, wherein modulating the illumination comprises modulating the illumination of the at least one region of the image further based on the motion value of the at least one region.

25. The method as claimed in claim 20, wherein determining the region of interest comprises determining at least one region comprising at least one of:
   a defined shape;
   a defined object;
   an object moving at a defined velocity;
   an object moving with a defined trajectory;
   a body;
   a face;
   an edge; and
   a corner.

26. The method as claimed in claim 19, wherein modulating the illumination further comprises modulating the illumination of the at least one region of the image based on an average motion between the image and the at least one of the previous image and the successive image.

27. The method as claimed in claim 15, wherein the at least one indicator of a power characteristic comprises at least one of:
   a power capacity of a power source; and
   an estimated power requirement of an apparatus.

* * * * *